United States Patent Office 3,575,693
Patented Apr. 20, 1971

3,575,693
PROCESS FOR THE PRODUCTION OF PHOSPHONITRILIC HALIDES
John Emsley, Barnet, and Peter Balfour Udy, London, England, assignors to Castrol Limited, London, England
No Drawing. Filed Mar. 15, 1968, Ser. No. 713,306
Claims priority, application Great Britain, Mar. 16, 1967, 12,381/67
Int. Cl. B01j *11/00;* C01b *25/00*
U.S. Cl. 23—357         13 Claims

ABSTRACT OF THE DISCLOSURE

Cyclic polymers of the formula $(PNCl_2)_n$ wherein $n$ is an integer of at least 3 are prepared by reacting phosphorus pentachloride with ammonium chloride in the presence of a catalyst of the formula $PAX_3$ wherein A is oxygen or sulphur and X is chlorine or bromine, the phosphorus pentachloride, ammonium chloride and the catalyst being in specified molar proportions.

---

This invention relates to a process for the preparation of phosphonitrilic halides, more particularly phosphonitrilic chlorides.

Reactions between phosphorus pentachloride and ammonium chloride in the presence of catalysts have been proposed, the products of the reactions being, in general, linear phosphonitrilic chlorides.

It has also been proposed to react phosphorous pentachloride with ammonium chloride in the absence of catalysts by bringing the major proportion of phosphorous pentachloride required for the reaction into contact with the ammonium chloride progressively over the reaction period. This method is said to produce a product containing about 95% cyclic polymers. This process suffers from the disadvantage that it is time consuming.

We have now found that it is possible by suitable choice of catalyst to produce a reaction product which may comprise a major proportion of cyclic phosphonitrilic chlorides of the formula $(PNCl_2)_n$ where $n$ is an integer. It will be understood by those skilled in the art that $n$ must be at least 3.

Accordingly the present invention provides a process for the preparation of cyclic polymers of the formula $(PNCl_2)_n$ wherein $n$ is an integer of at least 3, which process comprises reacting phosphorus pentachloride with ammonium chloride in a molar ratio of not more than 1:1 in the presence of a catalyst of the formula $PAX_3$ wherein A is oxygen or sulphur and X is chlorine or bromine, the reaction being carried out in the absence of a solvent or in the presence of a halogenated hydrocarbon solvent and the catalyst being present in an amount of less than 1 mole to each mole of phosphorus pentachloride.

In general the phosphorus pentachloride will be employed in a proportion of 1 mole to each mole of ammonium chloride or only slightly less than 1 mole e.g. 0.95 mole to each mole of ammonium chloride. However a significant amount of ammonium chloride in excess of an equimolar amount can be used.

Although the reaction can be carried out without the use of a solvent it is preferred to use a chlorinated hydrocarbon solvent such as symmetrical-tetrachloroethane and to carry out the reaction at the solvent reflux temperature.

Other solvents which may be employed in the present invention are chlorobenzene, o-dichlorobenzene and 1,2,4-trichlorobenzene. Preferably the reactants are present in an amount of not more than 300 grams to each litre of chlorinated hydrocarbon solvent.

Preferably the catalyst for the reaction is a phosphorus oxyhalide, the halogen atom being chlorine or bromine.

The catalyst may be present in a proportion of not less than 0.025 mole, preferably from 0.05 to 0.5 mole, to each mole of phosphorus pentachloride. Optimum catalyst concentration is usually found to be about 0.20 mole of catalyst to each mole of phosphorus pentachloride.

It is possible to carry out the reaction in the presence of a compound which, under the reaction conditions, will produce the catalyst of the formula $PAX_3$. In one aspect the process according to the invention comprises reacting the phosphorus pentachloride with the ammonium chloride in the presence of a small quantity of water, which will react with part of the phosphorus pentachloride to produce a proportion of phosphorus oxychloride which catalyses the reaction.

It is also possible to use other compounds which will liberate water or will react with the phosphorus pentachloride to produce the catalyst of the formula $PAX_3$ under the conditions of the reaction, i.e. to produce a catalyst in situ. Examples of suitable compounds which can be used in this way are hydrated metal salts such as hydrated magnesium sulphate, concentrated sulphuric acid, for example containing 98% $H_2SO_4$, certain hydroxides such as calcium hydroxide and also phosphorus pentoxide, oxalic acid and n-propanol.

Preferably the ammonium chloride employed in the process of the present invention is one having the characteristics of that marketed by May and Baker Limited as "Reagent Grade," which appears to produce a better result than certain other forms of ammonium chloride. It is believed that the result obtained when employing "Reagent Grade" ammonium chloride is due to the crystal structure of the ammonium chloride. Alternatively, the ammonium chloride could be formed in situ by passing gaseous ammonia and gaseous hydrochloric acid into the phosphorus pentachloride. Ammonium chloride having a finer crystal structure than the commercially available chloride may be prepared in this manner.

It is found that the reaction product of the process of the present invention contains a preponderance of cyclic polymers of the formula $(PNCl_2)_n$; linear products being present in varying quantities depending upon the catalyst used and the reaction conditions.

Accordingly the present invention also provides cyclic polymers of the formula $(PNCl_2)_n$ whenever prepared by the process of the invention. The cyclic polymers prepared in accordance with the present invention comprises about 80% trimer and tetramer, i.e. $(PNCl_2)_3$ and $(PNCl_2)_4$, the remaining 20% being composed of pentamer and higher polymers.

The invention will now be illustrated with reference to the following examples, in which Examples 9 and 26 to 29 inclusive are included for comparison.

EXAMPLE 1

$H_2O$ catalyst $PCl_5$ (208 g., 1.00 mole) and $NH_4Cl$ (54 g., 1.01 moles) were heated together in refluxing symtetrachloroethane (1 litre) in the presence of $H_2O$ (1.0 g., 0.06 mole). The reaction time was 3 to 3½ hours at the end of which evolution of HCl from the mixture had all but ceased. The products were cyclic polymers (84.0 g., 89% of total) and linear polymers (10.0 g., 11% of total).

EXAMPLE 2

Metal salt hydrate catalyst $PCl_5$ (208 g., 1.00 mole) and $NH_4Cl$ (54 g., 1.01 moles) were heated together in refluxing symtetrachloroethane (1,000 ml.) in the presence of $MgSO_4.H_2O$ (14 g., 0.10 mole). The reaction time was 1½ hours at the end of which evolution of HCl from the mixture had all but ceased. The products were cyclic polymers (47 g., 54% of total) and linear polymers (40 g., 46% of total).

EXAMPLE 3

Phosphorus oxychloride catalyst $PCl_5$ (208 g., 1.00 mole) and $NH_4Cl$ (54 g., 1.01 moles) were heated together in refluxing symtetrachloroethane (1 litre) in the presence of $POCl_3$ (15 g., 0.10 mole). The reaction time was 3 to 3½ hours at the end of which evolution of HCl from the mixture had all but ceased. The products were cyclic polymers (76 g., 87% of total) and linear polymers (12 g., 13% of total).

Examples 1 to 3 are summarised in Table I, together with further examples (4 to 8) of the process of the present invention. Table II summarises further examples in accordance with the present invention, together with one example (Example 9) in which no catalyst was employed. Examples 9 to 15 were carried out in a similar manner to Examples 1 to 8 but all on a half molar scale, and employed 500 mls. of symtetrachlorethane. The catalyst employed in each of Examples 10 to 15 was $POCl_3$ and the mole ratio $PCl_5:POCl_3$ was varied to demonstrate the results obtained with different proportions of the catalyst.

Table III summarises Examples 16 to 21 in which various quantities of symtetrafluoroethane solvent were employed. Examples 16 to 21 were carried out on a half molar scale with a mole ratio of $PCl_5:POCl_3$ of 1:0.05 and in a similar manner to Examples 1 to 8.

Table IV summarises the results of examples in which 500 mls. of various solvents were employed in accordance with the present invention (Examples 22 to 25) and attempts to employ various solvents other than those in accordance with the present invention (Examples 26 to 29). It will be noted that Examples 26 to 29 gave very poor results. It will also be noted that the reaction time in respect of Example 23 was rather high but the product obtained was of very high purity (97%). Examples 22, 24 and 26 to 29 were carried out on a half molar scale and in a similar manner to Examples 1 to 8. Example 25 was carried out with a $PCl_5:NH_4Cl$ ratio of 0.5:0.505.

Table V demonstrates the results obtained using $POBr_3$ and $PSCl_3$, in Examples 30 and 31 respectively, as catalyst. These two examples were carried out on a half molar scale using 500 mls. of solvent.

TABLE I

| Example No. | $PCl_5$ Wt. (g.) | $PCl_5$ Moles | $NH_4Cl$ Wt. (g.) | $NH_4Cl$ Moles | Catalyst Wt. (g.) | Catalyst Moles | Cyclic products Wt. (g.) | Cyclic products Yield, percent | Linear products Wt. (g.) | Linear products Yield, percent | Time, hours | Solvent[1] volume, ml. |
|---|---|---|---|---|---|---|---|---|---|---|---|---|
| 1 | 208 | 1.00 | 54 | 1.01 | [2]1.0 | [2]0.06 | 84 | 89 | 10 | 11 | 3½ | 1,000 |
| 2 | 208 | 1.00 | 54 | 1.01 | [3]14 | [3]0.10 | 47 | 54 | 40 | 46 | 1½ | 1,000 |
| 3 | 208 | 1.00 | 54 | 1.01 | [4]15 | [4]0.10 | 76 | 87 | 12 | 13 | 3½ | 1,000 |
| 4 | 52 | 0.25 | 15 | 0.27 | [4]7.7 | [4]0.05 | 23 | 97 | 0.6 | 3 | 3½ | 250 |
| 5 | 104 | 0.50 | 27 | 0.51 | [5]5 | [5]0.03 | 40 | 93 | 3 | 7 | 3 | 500 |
| 6 | 104 | 0.50 | 27 | 0.51 | [6]2.9 | [6]0.025 | 36 | 83 | 7 | 17 | 3½ | 500 |
| 7 | 104 | 0.50 | 27 | 0.51 | [7]3.5 | [7]0.05 | 44 | 89 | 6 | 11 | 3¼ | 500 |
| 8 | 104 | 0.50 | 27 | 0.51 | [8]3.0 | [8]0.05 | 40 | 78 | 11 | 21 | 4 | 500 |

[1] Solvent=symtetrachloroethane. [2] Water. [3] $MgSO_4H_2O$. [4] $POCl_3$. [5] $P_2O_5$. [6] $H_2SO_4$. [7] $Ca(OH)_2$. [8] n-$C_3H_7OH$.

TABLE II

| Example No.: | Mole ratio $PCl_5:POCl_3$ | Total yield, percent | Cyclic products Wt. (g.) | Cyclic products Yield, percent | Linear products Wt. (g.) | Linear products Yield, percent | Wt. $NH_4Cl$ recovered | Time, hours |
|---|---|---|---|---|---|---|---|---|
| 9 | 1:nil | 78 | 27.7 | 61 | 17.5 | 39 | 6.7 | 7 |
| 10 | 1:0.05 | 77 | 42.0 | 93 | 2.7 | 7 | 2.4 | 4¾ |
| 11 | 1:0.11 | 85 | 44.1 | 89 | 5.6 | 11 | | 3¼ |
| 12 | 1:0.20 | 82 | 46.0 | 97 | 1.4 | 3 | 6.0 | 3½ |
| 13 | 1:0.30 | 90 | 50.0 | 95 | 2.4 | 5 | 2.3 | 2½ |
| 14 | 1:0.45 | 74 | 40.0 | 93 | 3.1 | 7 | 7.6 | 3½ |
| 15 | 1:0.90 | 80 | 40.6 | 86 | 6.6 | 14 | 2.2 | 4½ |

TABLE III

| Example No. | Volume solvent, mls. | Total yield, percent | Cyclic products Wt. (g.) | Cyclic products Percent | Linear products Wt. (g.) | Linear products Percent | Wt. $NH_4Cl$ recovered | Time, hours |
|---|---|---|---|---|---|---|---|---|
| 16 | 150 | 92 | 33.1 | 63 | 20.5 | 37 | 1.3 | 4½ |
| 17 | 333 | 86 | 43.0 | 86 | 7.0 | 14 | 5.2 | 4½ |
| 18 | 500 | 77 | 42.0 | 93 | 2.7 | 7 | 2.4 | 4¾ |
| 19 | 750 | 85 | 48.0 | 97 | 1.7 | 3 | 3.0 | 4½ |
| 20 | 900 | 86 | 49.7 | 100 | 0 | 0 | 3.9 | 4½ |
| 21 | 1,000 | 85 | 49.1 | 100 | 0 | 0 | 3.8 | 4½ |

TABLE IV

| Example No. | Solvent | B.P., °C. | Mole ratio, $PCl_5:POCl_3$ | Total yield, percent | Cyclic products Wt. (g.) | Cyclic products Yield, percent | Linear products Wt. (g.) | Linear products Yield, percent | Time, hours |
|---|---|---|---|---|---|---|---|---|---|
| 22 | Symtetrachloroethane | 146 | 1:0.11 | 85 | 44.1 | 89 | 5.6 | 11 | 3¼ |
| 23 | Chlorobenzene | 132 | 1:0.11 | 88 | 49.5 | 97 | 1.5 | 3 | 12 |
| 24 | o-Dichlorobenzene | 179 | 1:0.10 | 61 | 32.3 | 90 | 3.5 | 10 | 1 |
| 25 | 1,2,4-trichlorobenzene | 213 | 1:0.075 | 59 | 31.4 | 88 | 4.0 | 12 | 3 |
| 26 | Tetrahydronaphthalene | 203–209 | 1:0.15 | 0 | 0 | 0 | 13.7 | ([1]) | 4½ |
| 27 | Ligroin | 115–120 | 1:0.10 | 0 | Very little reaction after 4½ hours. | | | | |
| 28 | $POCl_3$ | 108 | | Very slow reaction | | | | | |
| 29 | Dimethylformamide | | | Reacts with $PCl_5$ | | | | | |

[1] Resin.

TABLE V

| Example No. | Catalyst | Solvent | Mole ratio, $PCl_5$:catalyst | Total yield, percent | Cyclic products Wt. (g.) | Cyclic products Percent | Linear products Wt. (g.) | Linear products Yield, percent | Time, hours |
|---|---|---|---|---|---|---|---|---|---|
| 30 | $POBr_3$ | $C_2H_2Cl_4$ | 1:0.15 | 82 | 14.3 | 30 | 33.1 | 70 | 4½ |
| 31 | $PSCl_3$ | $C_2H_2Cl_4$ | 1:0.15 | 93 | 41.8 | 78 | 11.9 | 22 | 4 |

Infra-red spectra were taken of the cyclic products produced in accordance with the process of the present invention and these were identical with spectra taken with known cyclic products.

The spectrum, taken in Nujol mull, was as follows: 610 (s.), 725 (sh.), 752 (m.), 780 (w.), 875 (m.), 896 (w.), 1195 (v.s.), 1218 (v.s.), (broad peak) 2000 (v.w.), 2025 (v.w.). Nujol bands omitted.

We claim:

1. A process for the preparation of cyclic polymers of the formula $(PNCl_2)_n$ wherein $n$ is an integer of at least 3, which process comprises reacting phosphorus pentachloride with ammonium chloride in a molar ratio of not more than 1:1 in the presence of a catalytic amount of a catalyst of the formula $PAX_3$ wherein A is oxygen or sulphur and X is chlorine or bromine, the reaction being carried out by heating said reactants and catalyst in a halogenated hydrocarbon solvent.

2. A process as claimed in claim 1, wherein the catalyst is formed in situ by reacting part of the phosphorus pentachloride with a member selected from the group consisting of hydrated magnesium sulphate, water, phosphorus pentoxide, concentrated sulphuric acid, calcium hydroxide, oxalic acid and n-propanol.

3. A process as claimed in claim 1 wherein the reaction is carried out in the presence of a chlorinated hydrocarbon solvent.

4. A process as claimed in claim 3 wherein the chlorinated hydrocarbon solvent is symmetrical-tetrachloroethane, chlorobenzene, o-dichlorobenzene or 1,2,4-trichlorobenzene.

5. A process as claimed in claim 3 wherein the reactants are present in an amount of not more than 300 grams to each litre of chlorinated hydrocarbon solvent.

6. A process as claimed in claim 3 wherein the reaction is carried out at the refluxing temperature of the solvent.

7. A process as claimed in claim 1 wherein the catalyst is present in a proportion of about 0.025 mole to about 1 mole to each mole of phosphorus pentachloride.

8. A process as claimed in claim 7 wherein the catalyst is present in a proportion of from 0.05 to 0.5 mole to each mole of phosphorus pentachloride.

9. A process as claimed in claim 7 wherein the catalyst is present in a proportion of about 0.20 mole to each mole of phosphorus pentachloride.

10. A process as claimed in claim 1 wherein the catalyst is $POCl_3$, $POBr_3$ or $PSCl_3$.

11. A process for the preparation of cyclic polymers of the formula $(PNCl_2)_n$ wherein $n$ is an integer of at least 3, which process comprises reacting phosphorus pentachloride with ammonium chloride in a molar ratio of not more than 1:1 in the presence of a catalyst of the formula $POX_3$ wherein X is chlorine or bromine, the reaction being carried out by heating said reactants and catalyst in a chlorinated hydrocarbon solvent and the catalyst being present in an amount of about 0.025 to about 1 mole to each mole of phosphorus pentachloride.

12. A process as claimed in claim 11 wherein the catalyst is produced in situ by reacting part of the phosphorus pentachloride with a member selected from the group consisting of hydrated magnesium sulphate, water, phosphorus pentoxide, concentrated sulphuric acid, calcium hydroxide, oxalic acid and n-propanol.

13. A process as claimed in claim 11 wherein the chlorinated hydrocarbon solvent is symmetrical tetrachloroethane.

References Cited

UNITED STATES PATENTS

| | | | |
|---|---|---|---|
| 2,584,102 | 2/1952 | Mavity | 252—435 |
| 2,788,286 | 4/1957 | Teja et al. | 23—357 |
| 2,915,361 | 12/1959 | Knotz | 252—437 |
| 3,249,397 | 5/1966 | Nichols | 23—357 |
| 3,407,047 | 10/1968 | Paddock et al. | 23—357 |

OSCAR R. VERTIZ, Primary Examiner

H. S. MILLER, Assistant Examiner

U.S. Cl. X.R.

252—435, 436